US012683364B2

(12) United States Patent
Schmidt

(10) Patent No.: US 12,683,364 B2
(45) Date of Patent: Jul. 14, 2026

(54) ARC-RESISTANT SWITCH GEAR ENCLOSURE DOOR LATCH AND SEALING MECHANISMS OF A SWITCH GEAR

(71) Applicant: Siemens Industry, Inc., Alpharetta, GA (US)

(72) Inventor: Bernhard Schmidt, Cary, NC (US)

(73) Assignee: Siemens Industry, Inc., Alpharetta, GA (US)

( * ) Notice: Subject to any disclaimer, the term of this patent is extended or adjusted under 35 U.S.C. 154(b) by 306 days.

(21) Appl. No.: 18/418,398

(22) Filed: Jan. 22, 2024

(65) Prior Publication Data

US 2025/0239839 A1      Jul. 24, 2025

(51) Int. Cl.
  H02B 1/28 (2006.01)
  H02B 1/30 (2006.01)
  H02B 1/38 (2006.01)
(52) U.S. Cl.
  CPC .............. H02B 1/28 (2013.01); H02B 1/306 (2013.01); H02B 1/38 (2013.01)
(58) Field of Classification Search
  CPC . H02B 1/28; H02B 1/306; H02B 1/38; H02B 13/025; H05K 5/03
  See application file for complete search history.

(56) References Cited

U.S. PATENT DOCUMENTS

| | | | |
|---|---|---|---|
| 7,871,137 B2 | 1/2011 | Schulz et al. | |
| 8,733,853 B2 | 5/2014 | Gingrich | |
| 8,960,815 B2 | 2/2015 | Karandikar et al. | |
| 9,297,181 B2 | 3/2016 | Gasparetto | |
| 10,227,800 B2 | 3/2019 | Trussler | |
| 2003/0151337 A1* | 8/2003 | Leccia | H02B 1/38 |
| | | | 218/155 |
| 2008/0092449 A1* | 4/2008 | Kadziolka | H02B 1/38 |
| | | | 49/357 |
| 2008/0148642 A1* | 6/2008 | Mathieu | E05C 9/1875 |
| | | | 49/395 |
| 2013/0320831 A1* | 12/2013 | Schmidt | H02B 13/025 |
| | | | 49/495.1 |
| 2014/0097734 A1* | 4/2014 | Gingrich | H02B 1/38 |
| | | | 312/326 |
| 2017/0040778 A1* | 2/2017 | Bonfanti | H02B 1/38 |

* cited by examiner

*Primary Examiner* — Jacob R Crum

(57) ABSTRACT

An arc resistant switch gear comprises a switchgear enclosure including a circuit breaker a high voltage door and enclosure door latch and sealing mechanisms. These mechanisms are configured to provide a combination of latching and sealing functionality to seal and latch the switchgear enclosure with the high voltage door via a door latching and sealing system in combination with a latch part and a door frame. To remove the circuit breaker out of the switchgear enclosure a door sealing slider which is in the switchgear enclosure must be removed.

18 Claims, 19 Drawing Sheets

View A-A

View B

View A-A

View B

View A-A

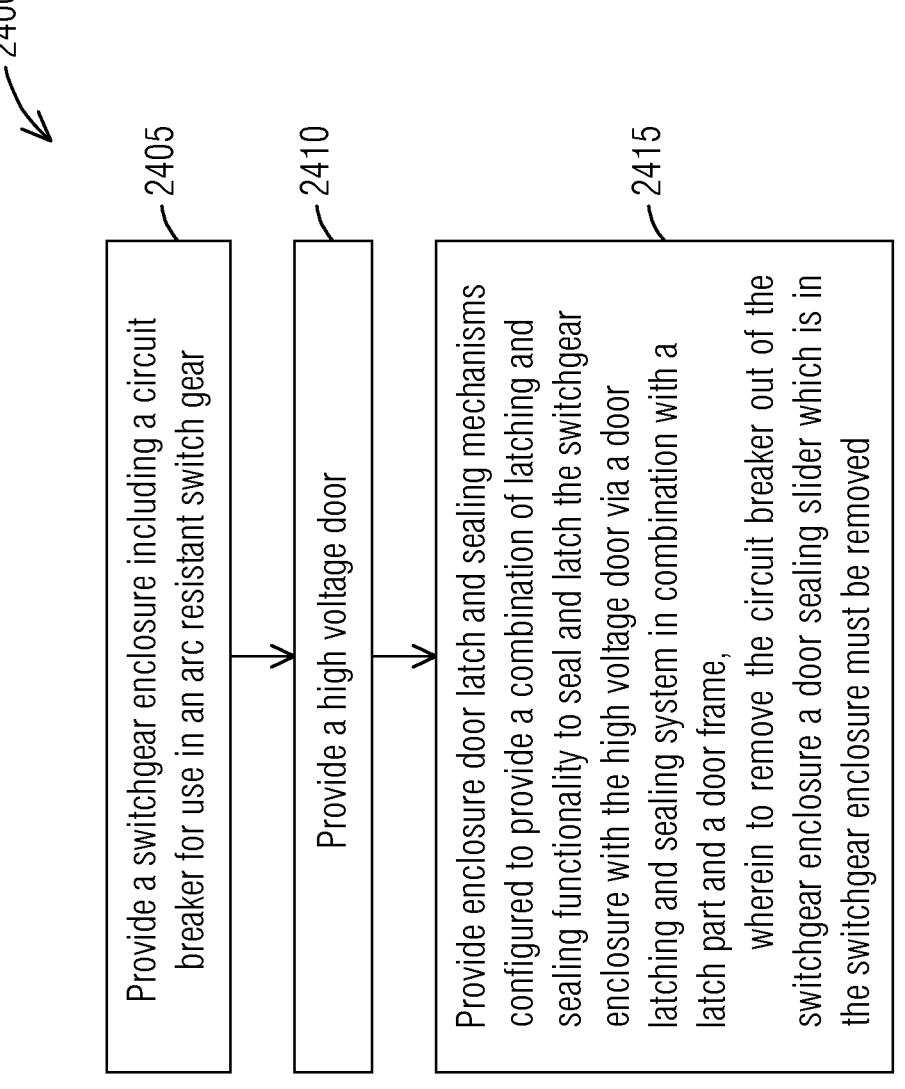

2400

2405

Provide a switchgear enclosure including a circuit breaker for use in an arc resistant switch gear

2410

Provide a high voltage door

2415

Provide enclosure door latch and sealing mechanisms configured to provide a combination of latching and sealing functionality to seal and latch the switchgear enclosure with the high voltage door via a door latching and sealing system in combination with a latch part and a door frame, wherein to remove the circuit breaker out of the switchgear enclosure a door sealing slider which is in the switchgear enclosure must be removed

FIG. 24

ARC-RESISTANT SWITCH GEAR ENCLOSURE DOOR LATCH AND SEALING MECHANISMS OF A SWITCH GEAR

BACKGROUND

1. Field

Aspects of the present invention generally relate to a switch gear including an arc-resistant switchgear enclosure door latch and sealing mechanisms.

2. Description of the Related Art

To seal and latch a switchgear enclosure with a high voltage door, so far multipoint door latches, sealing plates, flaps and gaskets are used to seal an enclosure with an ARC resistant door. The enclosure has an opening to drive the circuit breaker into the switchgear. This opening is sealed with a slide on the enclosure.

Therefore, a combination of latching and sealing is then needed to seal and latch a switchgear enclosure with a high voltage door.

SUMMARY

Briefly described, aspects of the present invention relate to a combination of a latching and sealing system for an enclosure and a high voltage door for an arc resistant switch gear.

In accordance with one illustrative embodiment of the present invention, an arc resistant switch gear comprises a switchgear enclosure including a circuit breaker, a high voltage door and enclosure door latch and sealing mechanisms configured to provide a combination of latching and sealing functionality to seal and latch the switchgear enclosure with the high voltage door via a door latching and sealing system in combination with a latch part and a door frame. To remove the circuit breaker out of the switchgear enclosure a door sealing slider which is in the switchgear enclosure must be removed.

In accordance with one illustrative embodiment of the present invention, a method is provided. The method comprises providing a switchgear enclosure including a circuit breaker for use in an arc resistant switch gear, providing a high voltage door and providing enclosure door latch and sealing mechanisms configured to provide a combination of latching and sealing functionality to seal and latch the switchgear enclosure with the high voltage door via a door latching and sealing system in combination with a latch part and a door frame. To remove the circuit breaker out of the switchgear enclosure a door sealing slider which is in the switchgear enclosure must be removed.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 24 illustrates a method in accordance with an embodiment of the present invention.

DETAILED DESCRIPTION

Figure 1:
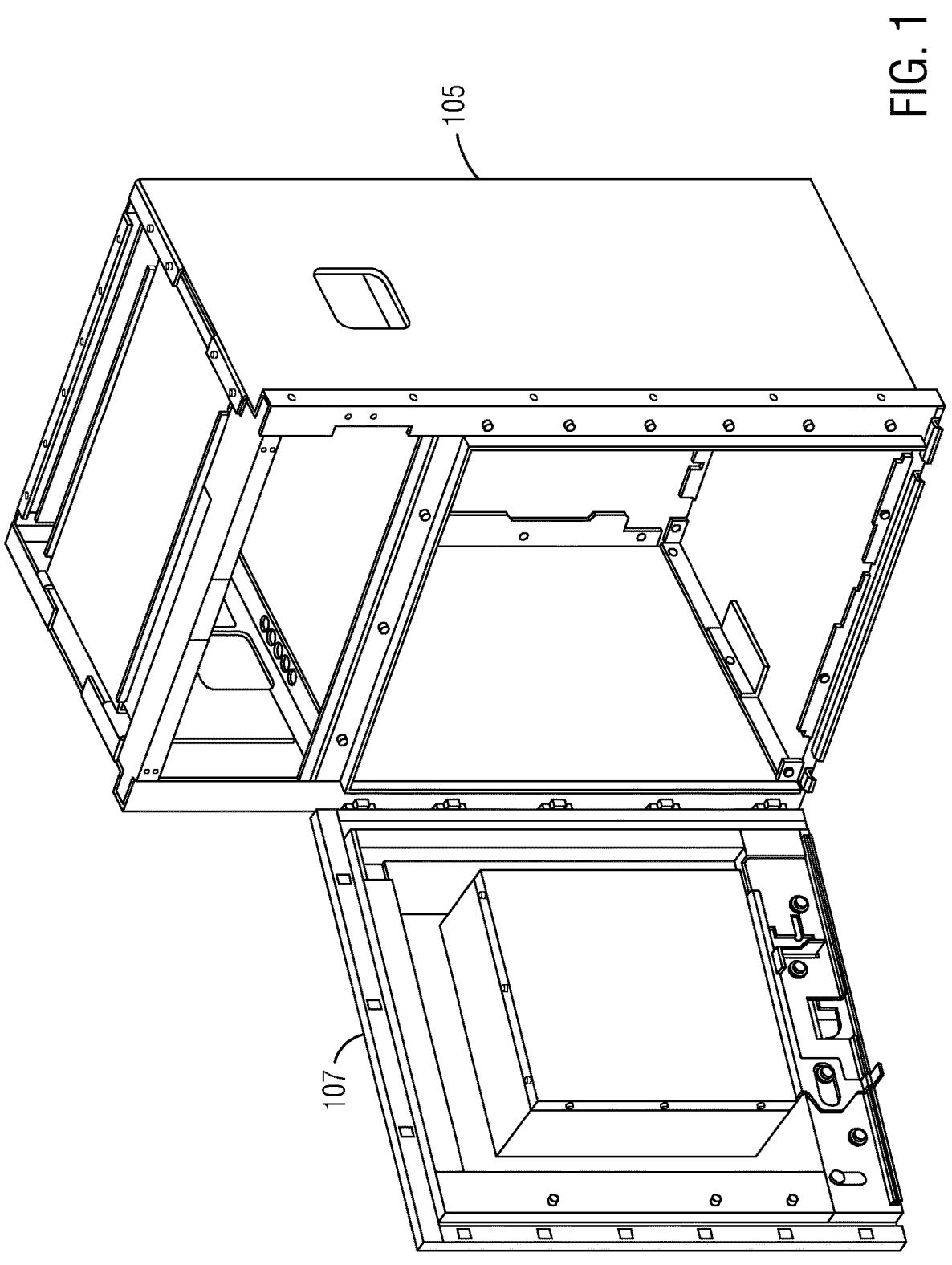
FIG. 1 illustrates a view of a switch gear enclosure having a partially opened door in accordance with an embodiment of the present invention.

Various technologies that pertain to systems and methods that provide a combination of latching and sealing to seal and latch a switchgear enclosure with a high voltage door are presented. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a combination of a latching and sealing system for an enclosure and a high voltage door for an arc resistant switch gear. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the system are provided for providing a in switch gear including an arc-resistant switchgear enclosure door latch and sealing mechanisms according to the present disclosure are described below with reference to FIG. 1 herein. The drawing is not necessarily drawn to scale.

An arc resistant switch gear comprises a switchgear enclosure including a circuit breaker (not shown), a high voltage door and enclosure door latch and sealing mechanisms configured to provide a combination of latching and sealing functionality to seal and latch the switchgear enclosure with the high voltage door via a door latching and sealing system in combination with a latch part and a door frame. To remove the circuit breaker out of the switchgear enclosure a door sealing slider which is in the switchgear enclosure must be removed.

Consistent with an embodiment of the present invention, FIG. 1 represents a switch gear enclosure 105 having a partially opened door 107 in accordance with an embodiment of the present invention. An arc resistant switch gear comprises the switch gear enclosure 105 including enclosure door latch and sealing mechanisms configured to provide a combination of latching and sealing functionality as explained in detail below.

Switch gear is a term that describes a collection of switching devices that serve to control, protect and isolate power systems. Also, the definition will extend to circuit breakers and devices that meter a power system. This definition can be extended to include devices to regulate and meter a power system, circuit breakers, and similar technology. Switch gear includes fuses, switches, relays, isolators, circuit breaker, potential and current transformer, indicating device, lightning arresters, etc. There are three primary types of switch gear: low voltage (less than 1 kV), medium voltage (up to 36 kV), and high voltage (above 36 kV). There are three basic functions of switch gear power systems: electrical protection, electrical isolation, and control. Switch gear power systems are the combination of electrical disconnects that serve the function of isolating electrical equipment. The electrical disconnects can either be fuses or circuit breakers.

Figure 2B:
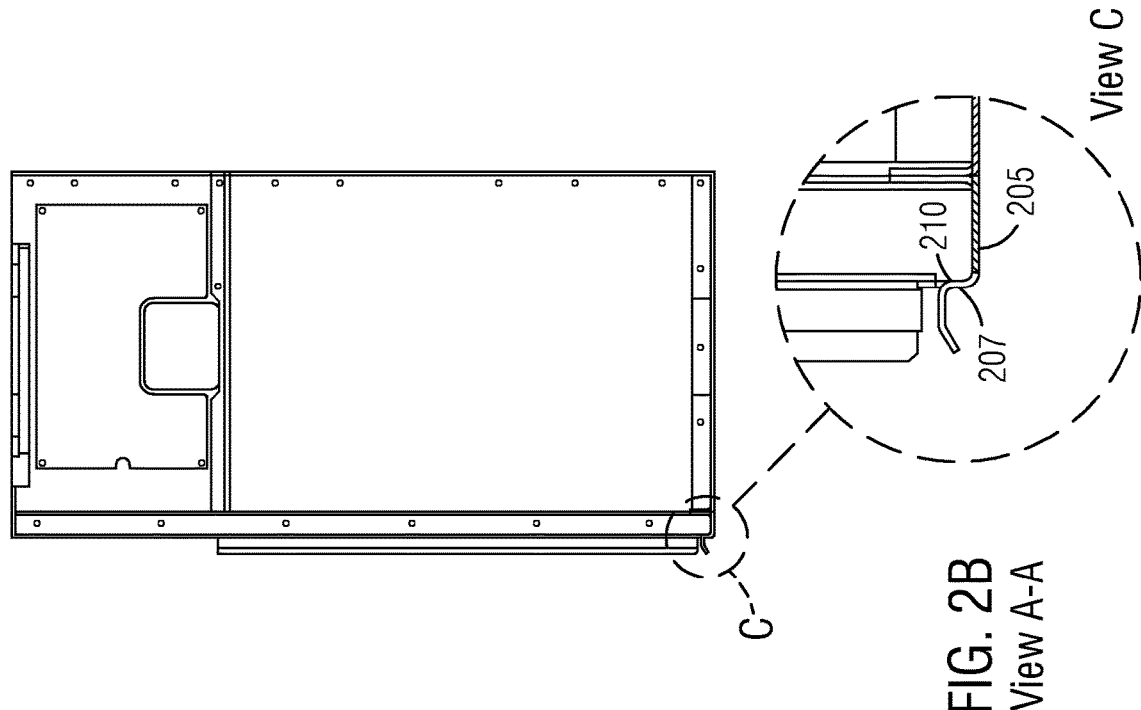
FIGS. 2A-2B illustrate views of a switch gear enclosure in accordance with an embodiment of the present invention.
Figure 2A:
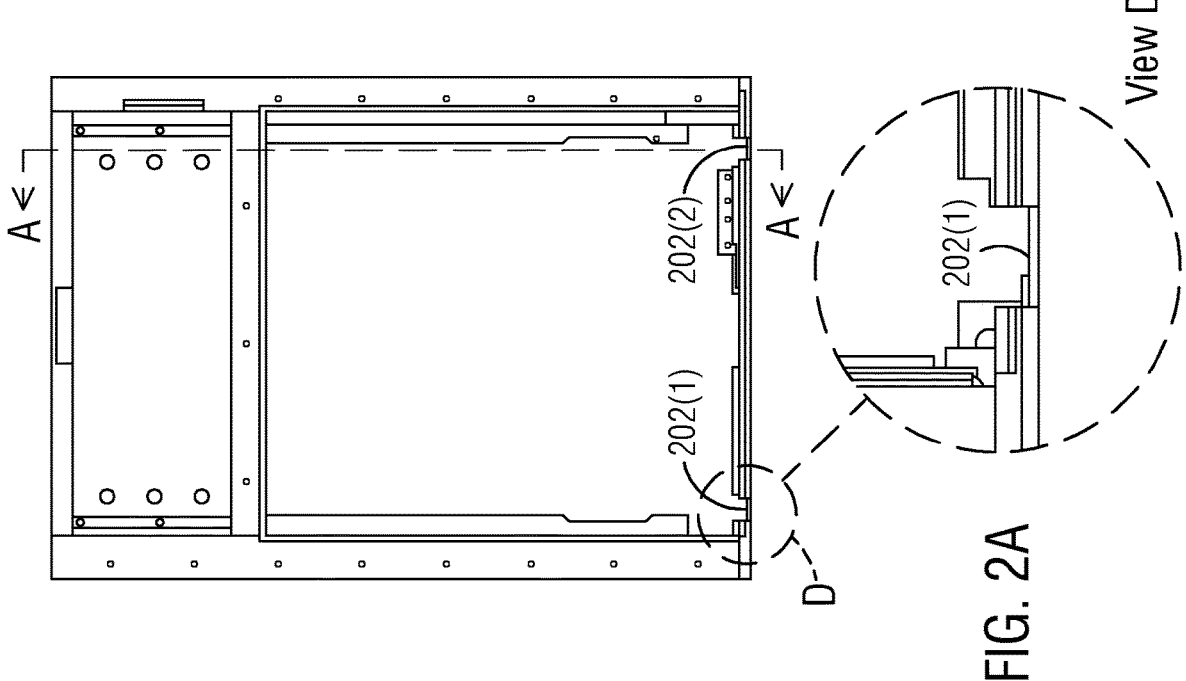

Referring to FIGS. 2A-2B, they illustrate views of the switch gear enclosure 105 in accordance with an embodiment of the present invention. The door 107 seals openings 202(1) and 202(2). Enclosure door latch and sealing mechanisms include a slider (305, as seen in FIG. 3B) with a sealing member (307, as seen in FIG. 3B) disposed along a door button side 205 and a flange 207 of the door 107 and in enclosure seals 210 along an inside (310, as seen in FIG. 3B) of the button part (312, as seen in FIG. 3B).

Figures 3A, 3B:
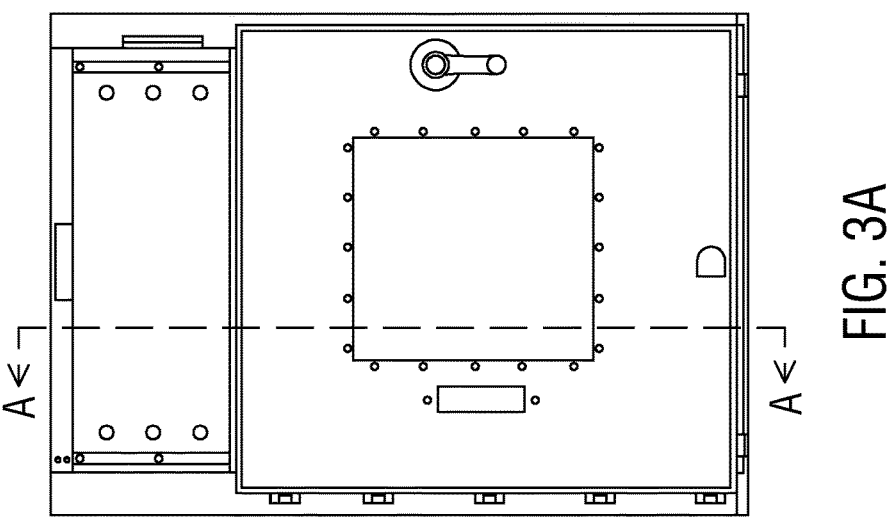
FIGS. 3A-3B illustrate views of a switch gear enclosure where the door is in closed position as latched in accordance with an embodiment of the present invention.
Figures 6A, 6B, 6C:
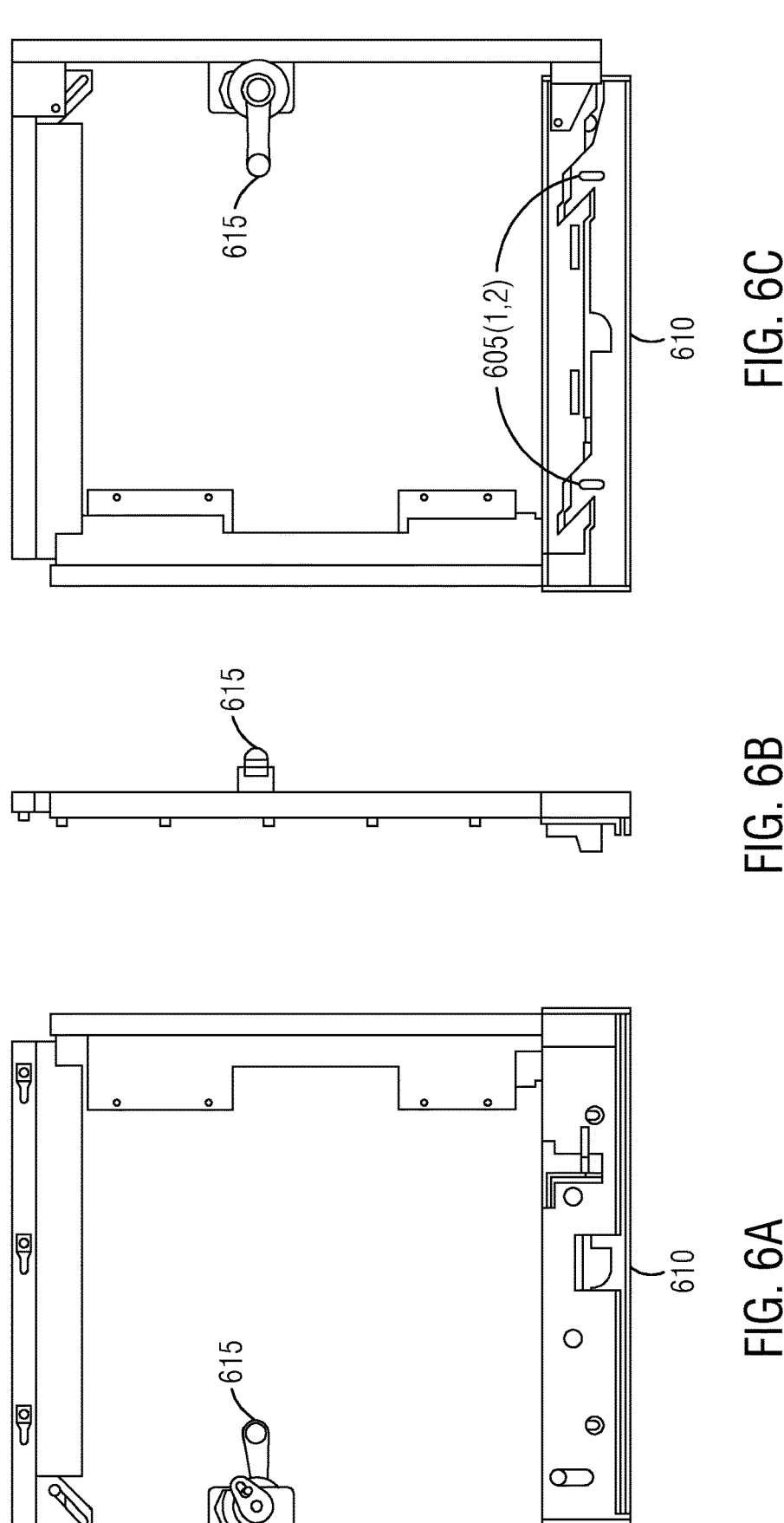
FIGS. 6A-6F illustrate views of an inner and outer side of the door mechanism in accordance with an embodiment of the present invention.
Figure 6F:
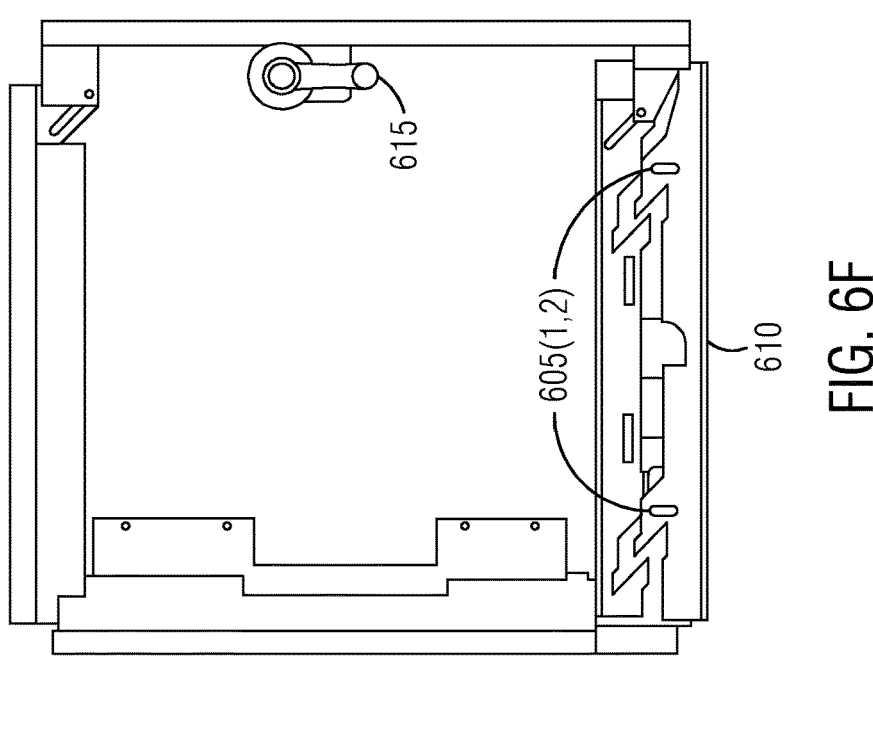
Figure 6E:
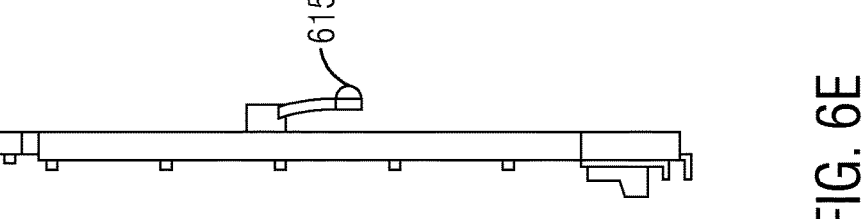
Figure 6D:
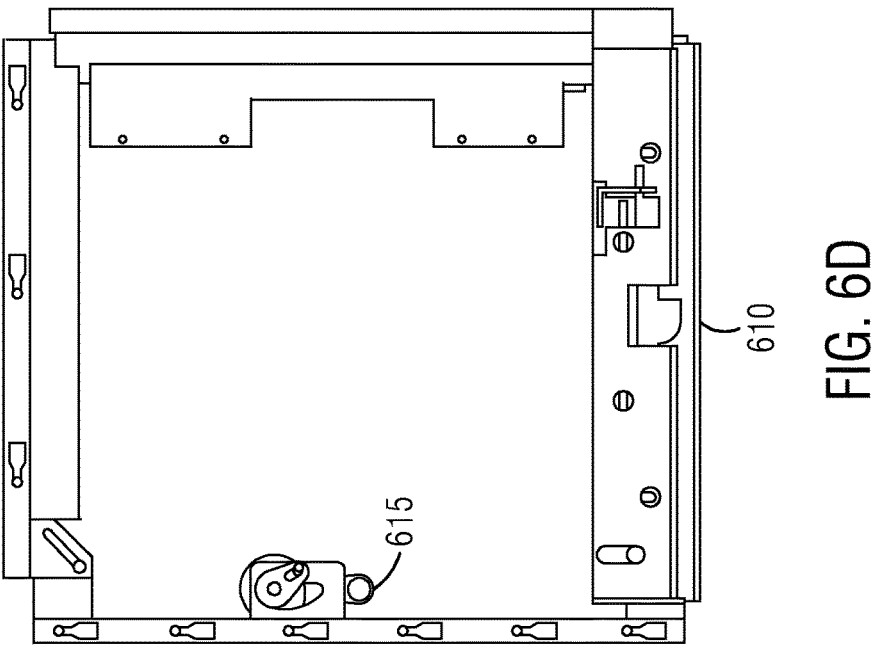

Turning now to FIGS. 3A-3B, they illustrate views of the switch gear enclosure 105 where the door 107 is in a closed position as latched in accordance with an embodiment of the present invention. The door 107 also seals the openings 202(1) and 202(2). The slider 305 is mounted between 2 plates 315(1-2) that are mounted on a door 320. There are 2 slots (605(1-2), as seen in FIG. 6C) in the slider 305 for moving up and down a part (610, as seen in FIGS. 6C and 6F). The slider 305 is locked in when a handle 615 is closed, the slider 305 can't move up when a force through an arc flash hits the door 107.

Figures 4A, 4B:
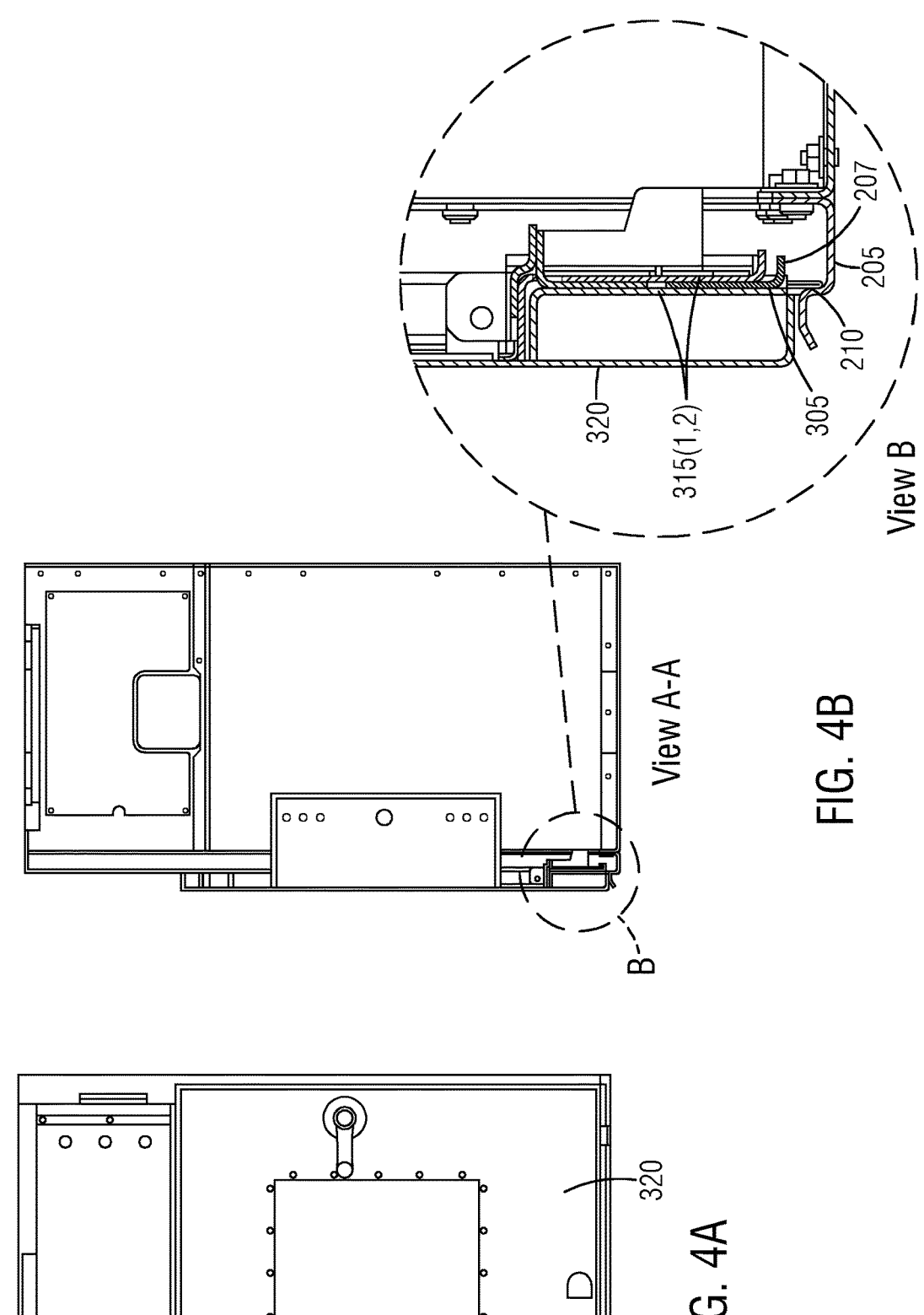
FIGS. 4A-4B illustrate views of a switch gear enclosure where the door is in opened position as unlatched in accordance with an embodiment of the present invention.

FIGS. 4A-4B illustrate views of a switch gear enclosure where the door is in opened position as unlatched in accordance with an embodiment of the present invention. The slider 305 includes the sealing member 307 disposed along the door button side 205 and the flange 207 of the door 107 and in the enclosure seals 210 along the inside 310 of the button part 312.

Figure 5B:
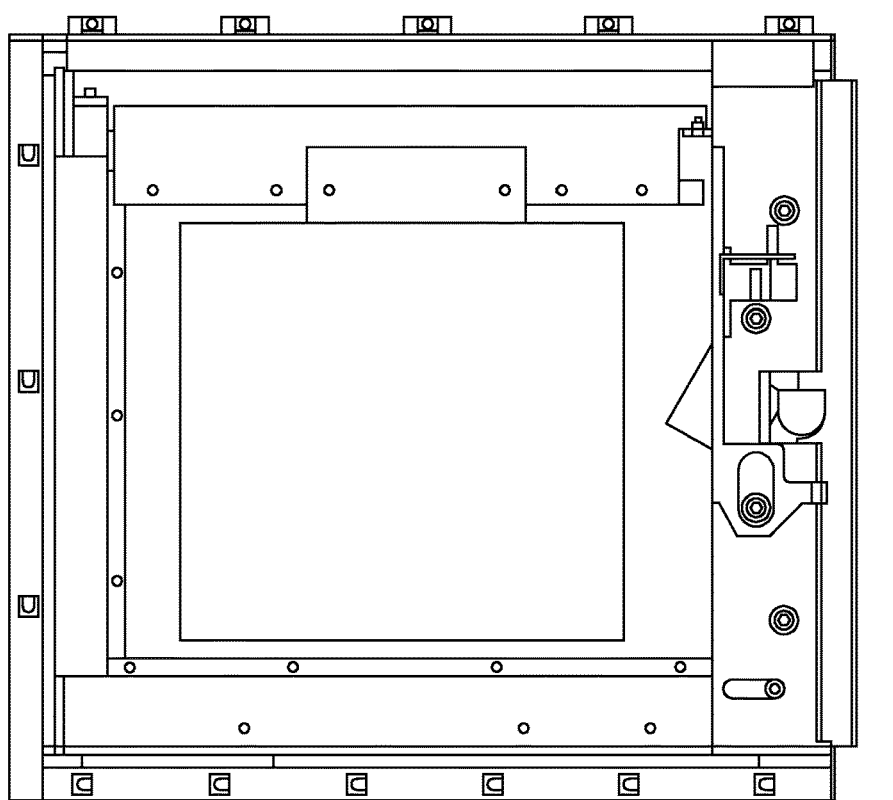
FIGS. 5A-5B illustrate views of an inner side of the door: unlatched and latched in accordance with an embodiment of the present invention.
Figure 5A:
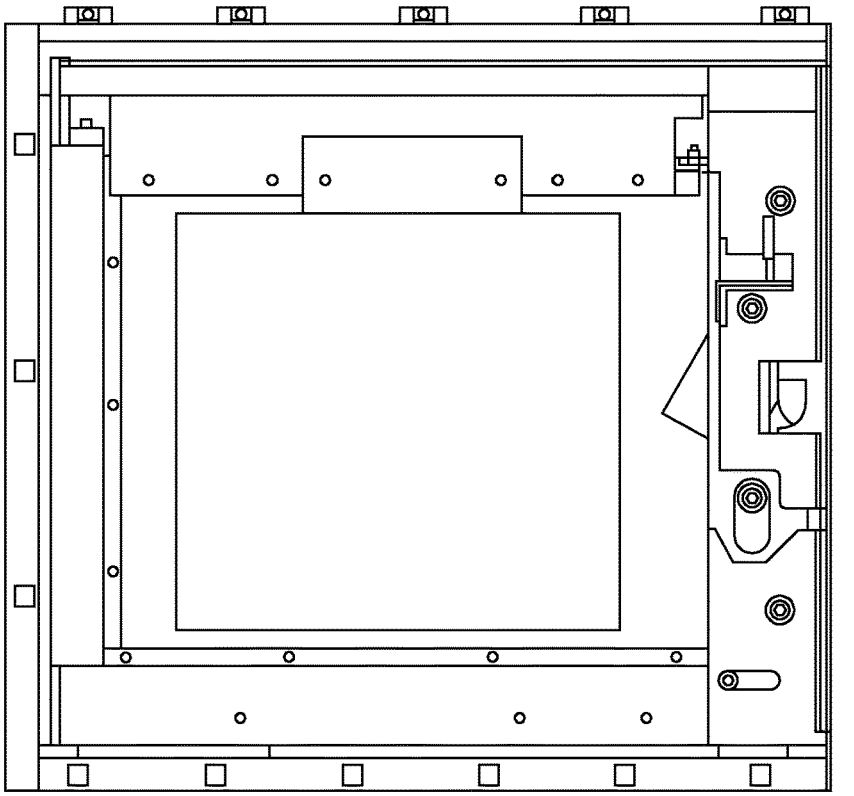

As seen in FIGS. 5A-5B, they illustrate views of an inner side of the door: unlatched and latched in accordance with an embodiment of the present invention. As shown in FIGS. 6A-6F, they illustrate views of an inner and outer side of the door mechanism in accordance with an embodiment of the present invention.

Figure 8:
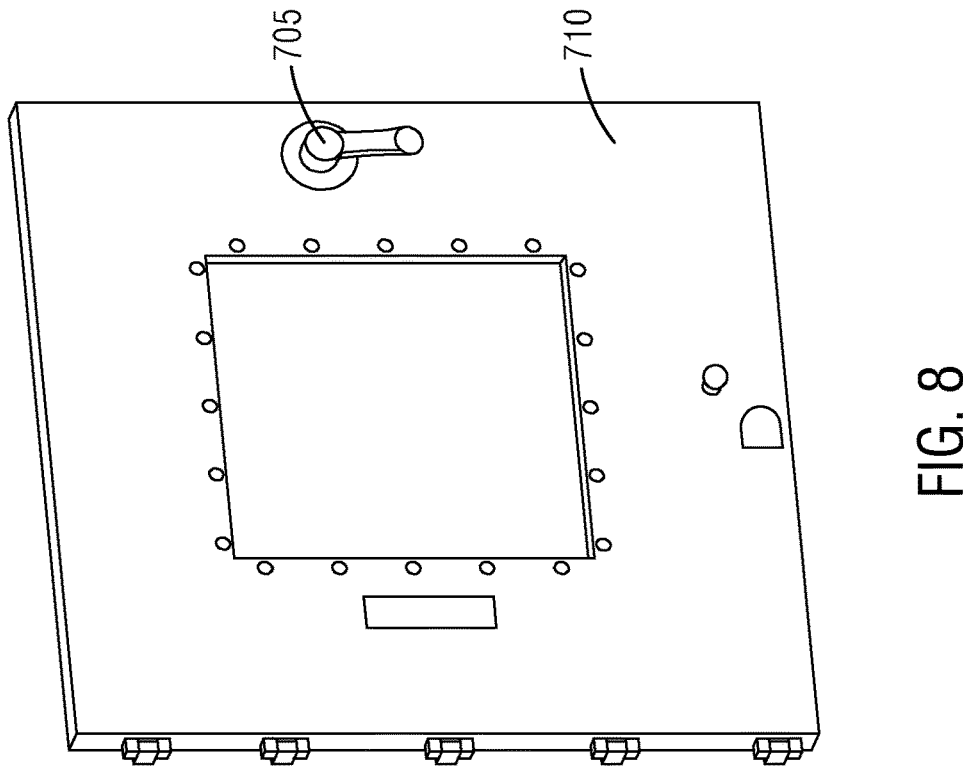
FIG. 8 illustrates a front view of a door in a closed (locked) position in accordance with an embodiment of the present invention.
Figure 7:
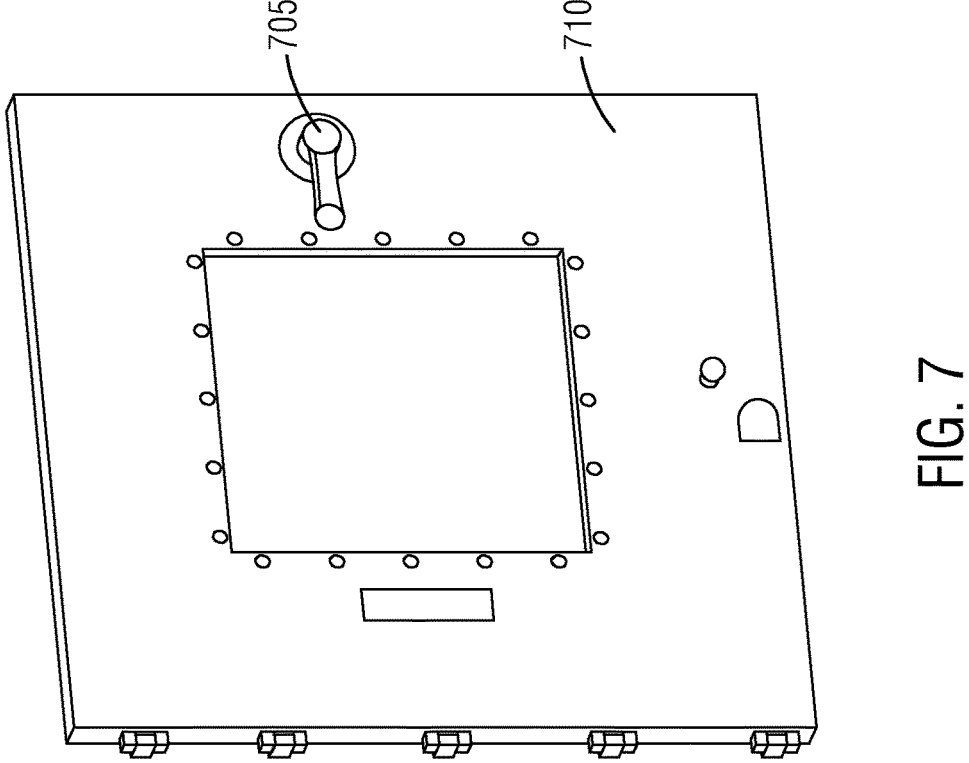
FIG. 7 illustrates a front view of a door in an open position in accordance with an embodiment of the present invention.

In FIG. 7, it illustrates a front view of a door 707 in an open position in accordance with an embodiment of the present invention. With regard to FIG. 8, it illustrates a front view of the door 707 in a closed (locked) position in accordance with an embodiment of the present invention.

Figure 10:
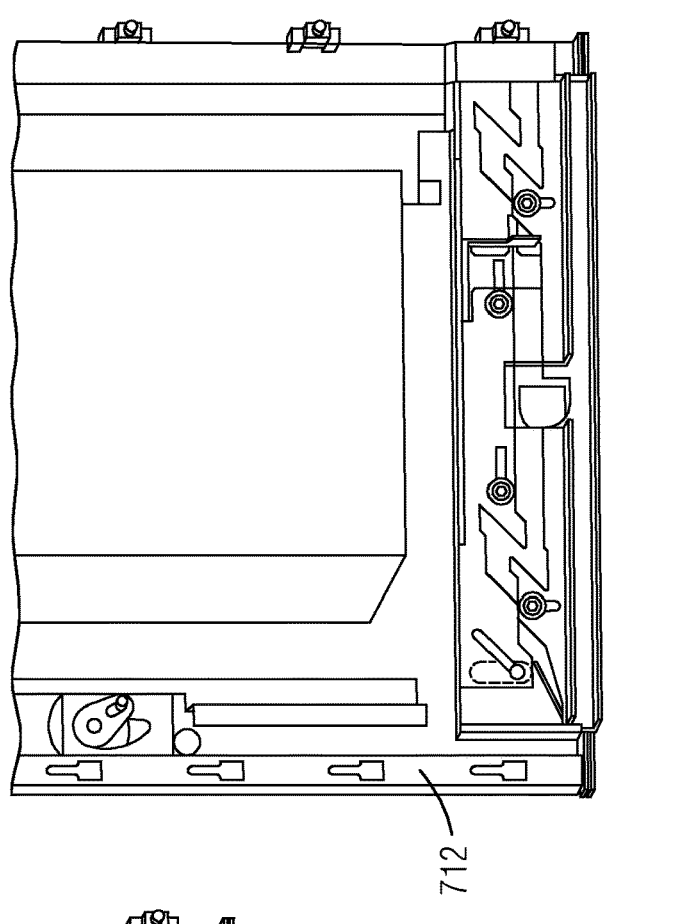
FIG. 10 illustrates an inside of the door view in a closed (locked) position in accordance with an embodiment of the present invention.
Figure 9:
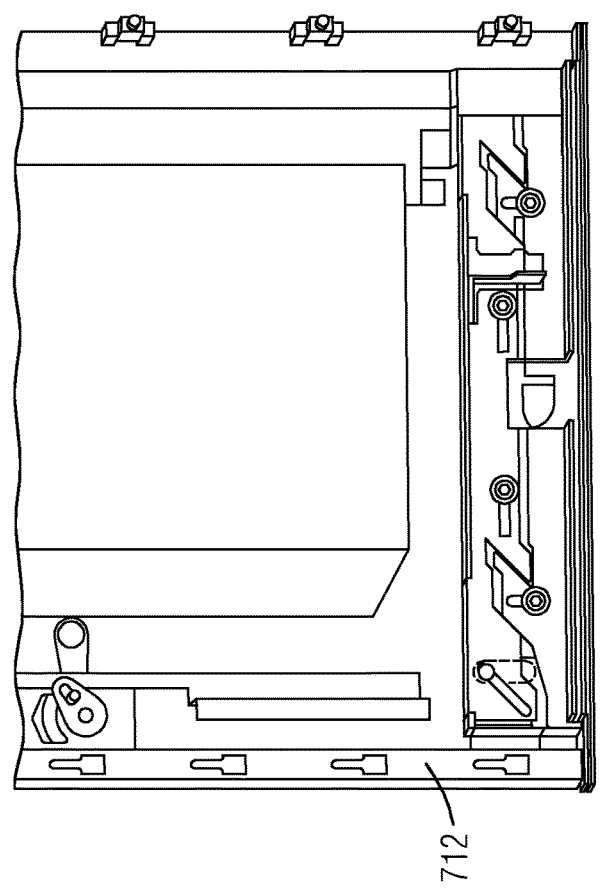
FIG. 9 illustrates an inside of the door view in an open position in accordance with an embodiment of the present invention.
Figure 11:
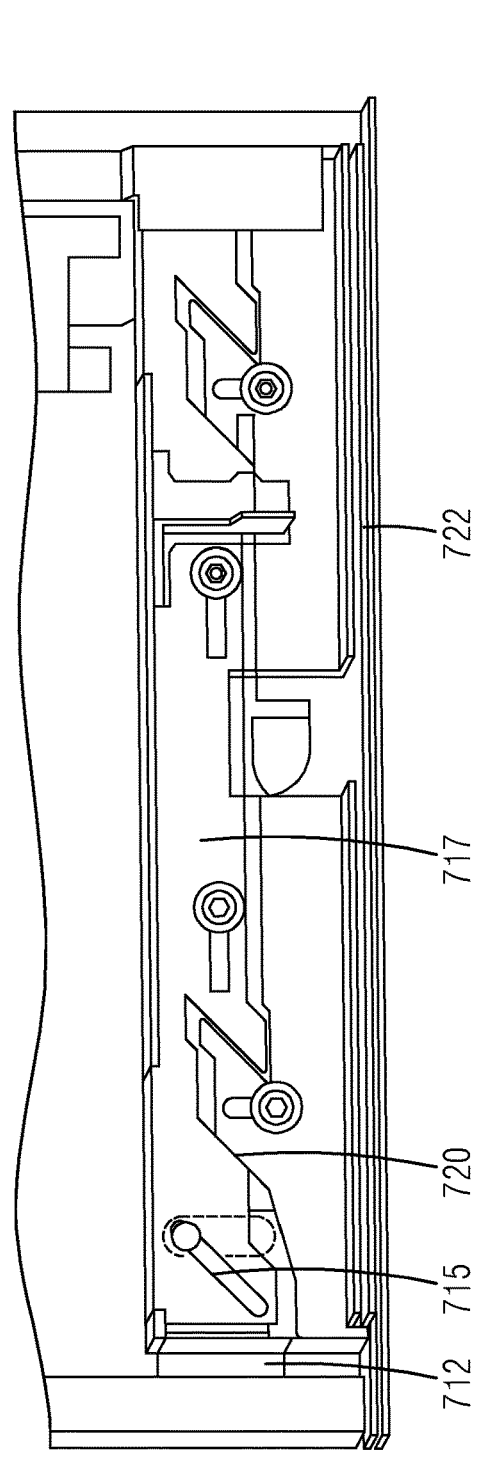
FIG. 11 illustrates details of the inside of the door view in an open position in accordance with an embodiment of the present invention.
Figure 12:
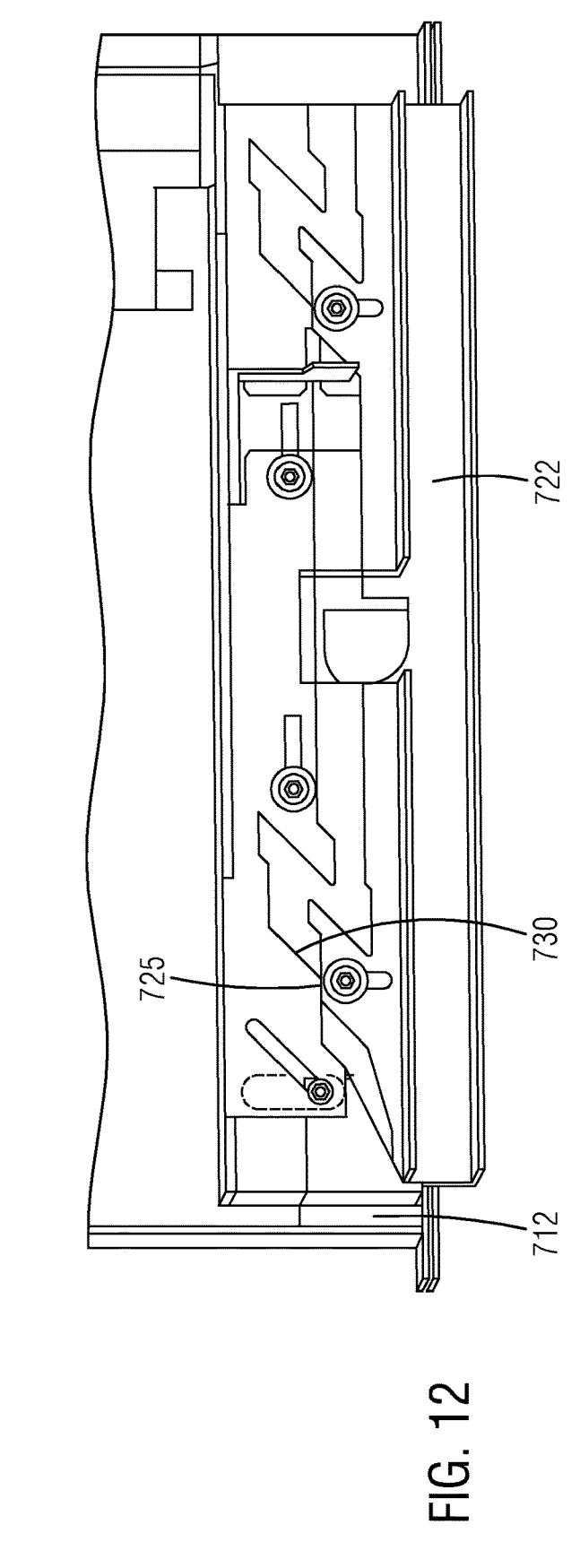
FIG. 12 illustrates details of the inside of the door view in a closed (locked) position in accordance with an embodiment of the present invention.

With respect to FIG. 9, it illustrates an inside of the door view in an open position in accordance with an embodiment of the present invention. FIG. 10 illustrates an inside of the door view in a closed (locked) position in accordance with an embodiment of the present invention. FIG. 11 illustrates details of the inside of the door view in an open position in accordance with an embodiment of the present invention. FIG. 12 illustrates details of the inside of the door view in a closed (locked) position in accordance with an embodiment of the present invention.

In operation, rotate a handle 705 on the door 707 against a door panel 710 and a door slider (or a door closing ledge) 712 moves downwards. The 45 deg 715 slot on a door closing ledge lower 717 will change a direction of movement 730. A sloping surface 720 will change the direction of movement 730. Enclosure door latch and sealing mechanisms include a door sealing and latching ledge 722 that will move. A surface 725 will lock the door sealing and latching ledge 722 in position when the door is locked.

Figure 14:
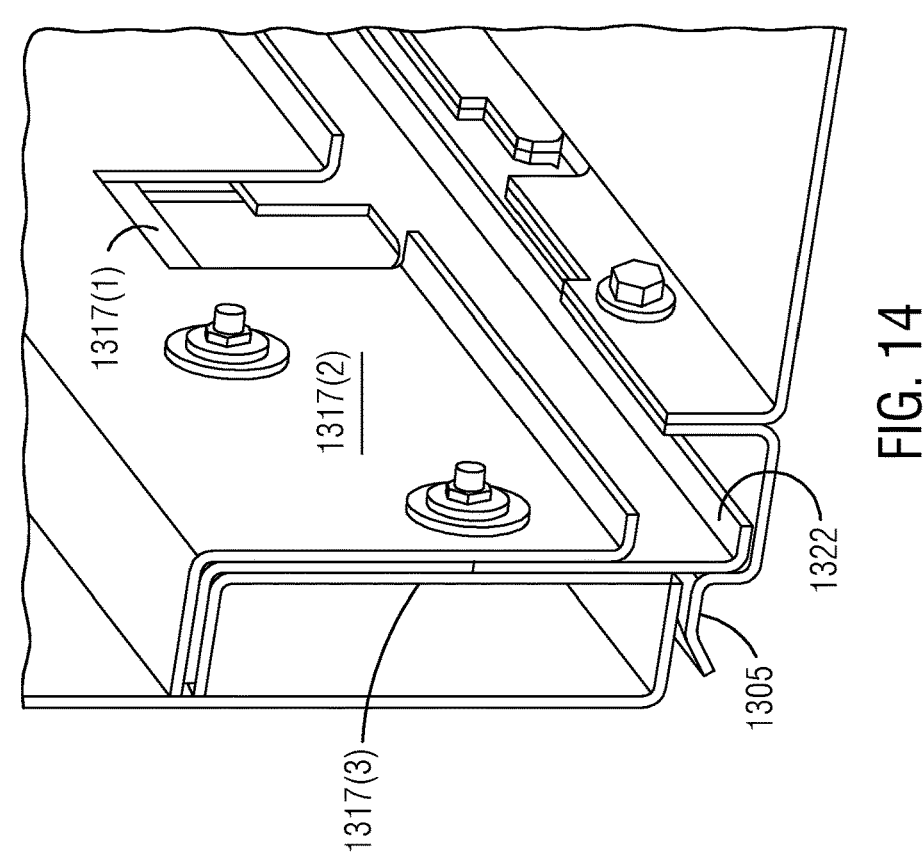
FIG. 14 illustrates a view of the door from the inside with a structure door in a closed (locked) position in accordance with an embodiment of the present invention.
Figure 13:
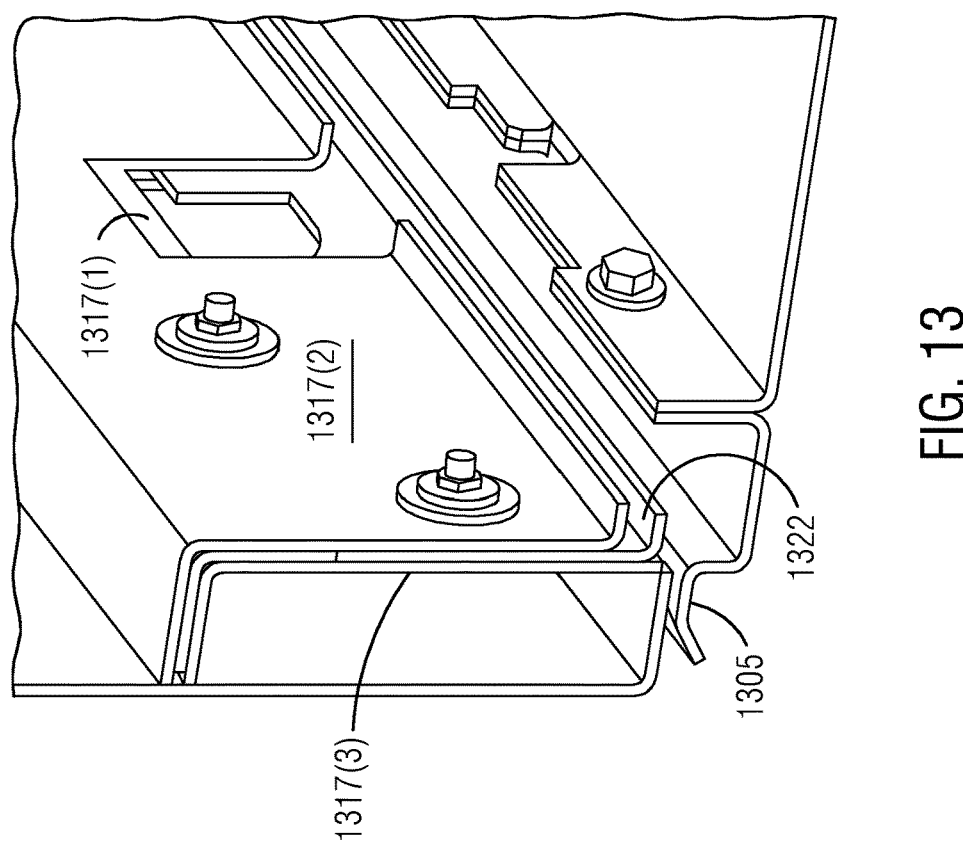
FIG. 13 illustrates a view of the door from the inside with a structure door in an open position in accordance with an embodiment of the present invention.
Figures 15, 16:
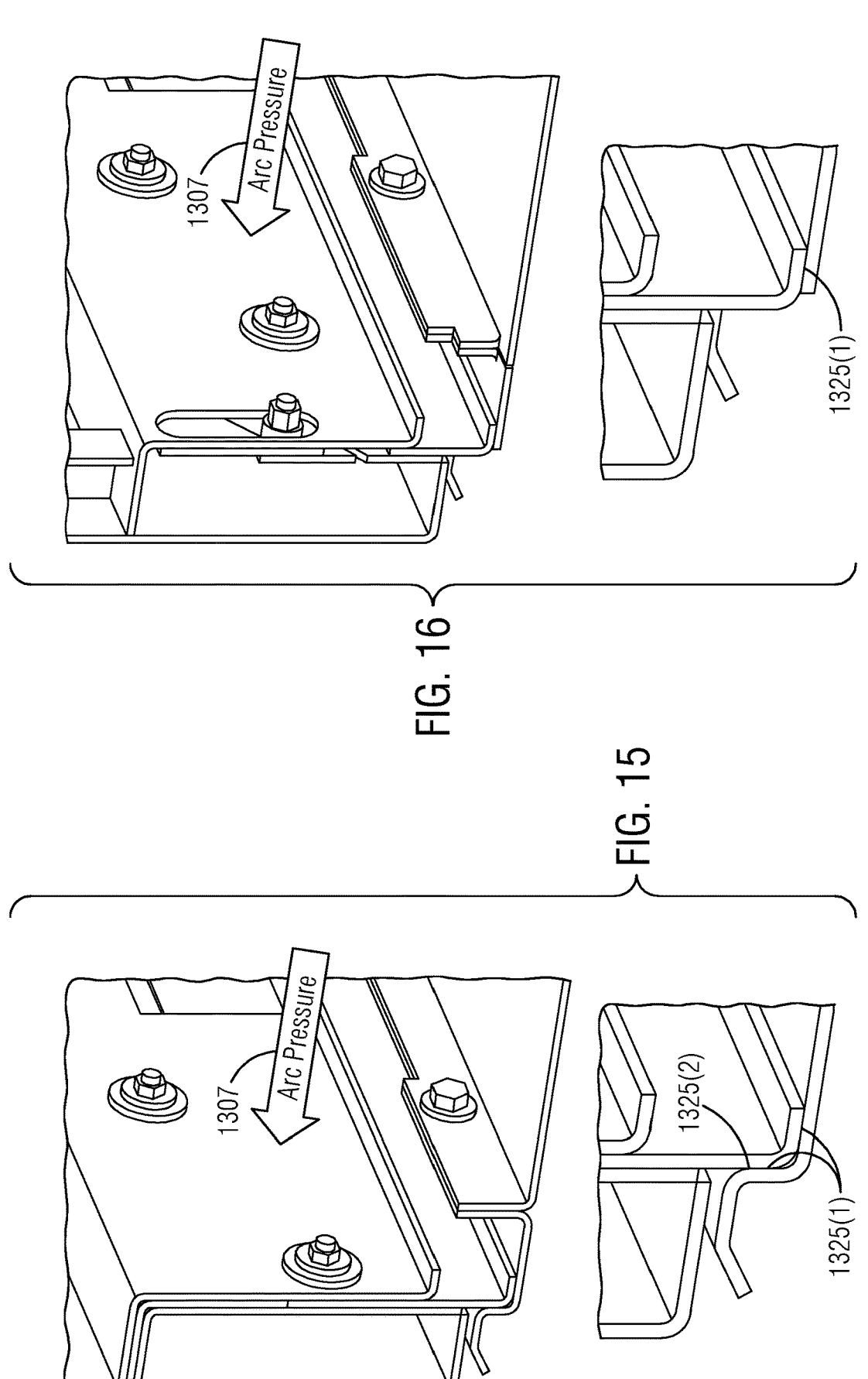
FIG. 15 illustrates a view of the door from the inside with a structure door in a closed (locked) position in accordance with an embodiment of the present invention.
FIG. 16 illustrates a view of the door from the inside with a structure door in a closed (locked) position in accordance with an embodiment of the present invention.

FIG. 13 illustrates a view of the door from the inside with a structure door in an open position in accordance with an embodiment of the present invention. FIG. 14 illustrates a view of the door from the inside with a structure door in a closed (locked) position in accordance with an embodiment of the present invention. FIG. 15 illustrates a view of the door from the inside with a structure door in a closed (locked) position in accordance with an embodiment of the present invention. FIG. 16 illustrates a view of the door from the inside with a structure door in a closed (locked) position in accordance with an embodiment of the present invention.

The main part of the enclosure door latch and sealing mechanisms is a door sealing and latching ledge 1322 and it moves up and down when the handle's rotation. The door sealing and latching ledge 1322 is mounted between a Door Closing Cover Lower 1317(2) and a Door Support Lower 1317(3) and close to a Door Closing Ledge Lower 1317(1). When an arc pressure 1307 hits a door, the door sealing and latching ledge 1322 will get pressed to a Door Frame 1305. The door sealing and latching ledge 1322 will provide door sealing 1325(1) and provide door latching 1325(2) to keep the arc pressure 1307 in a switchgear.

Figure 17:
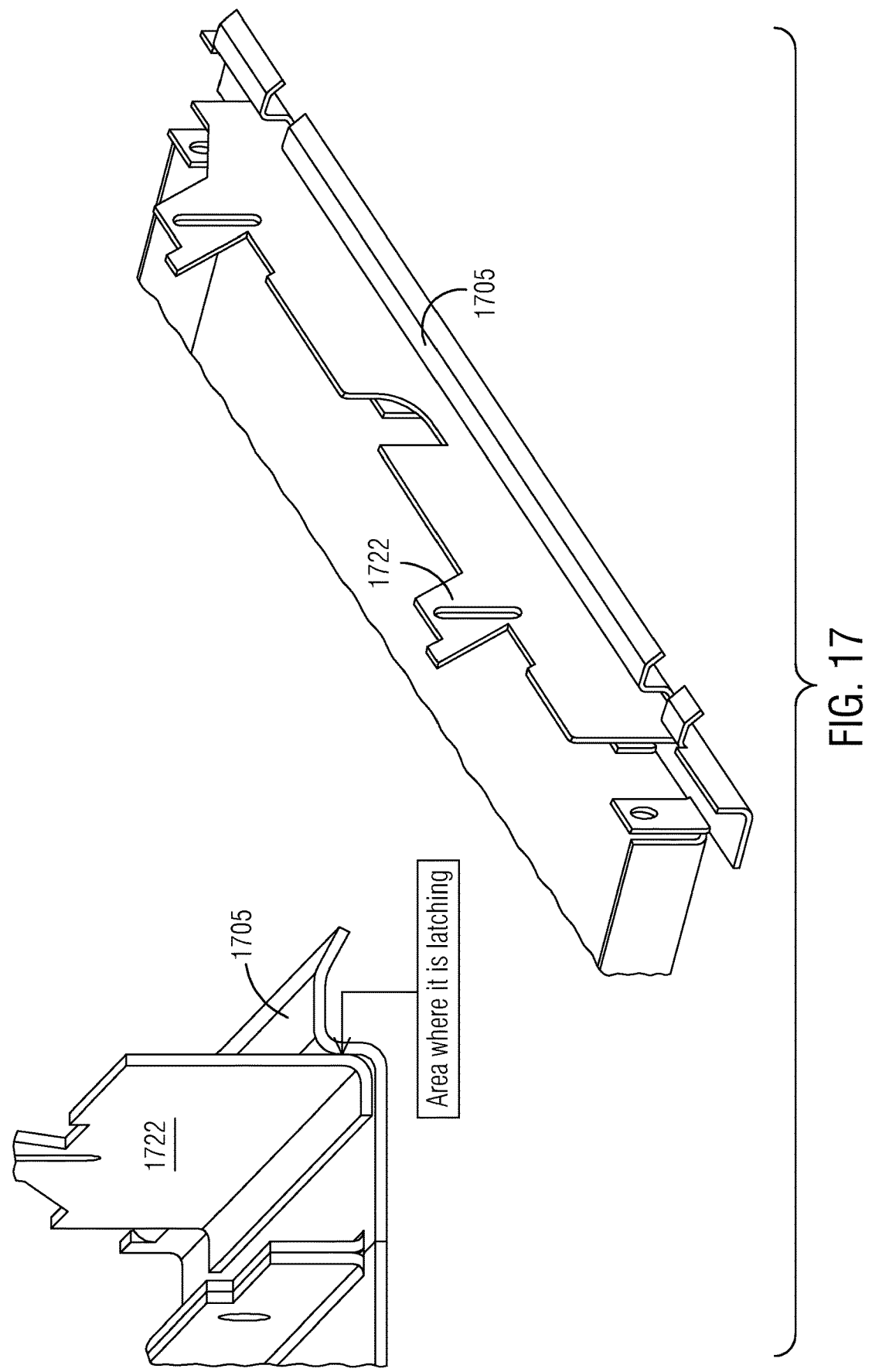
FIG. 17 illustrates a door sealing and latching ledge, is leading behind a door frame in accordance with an embodiment of the present invention.
Figure 18:
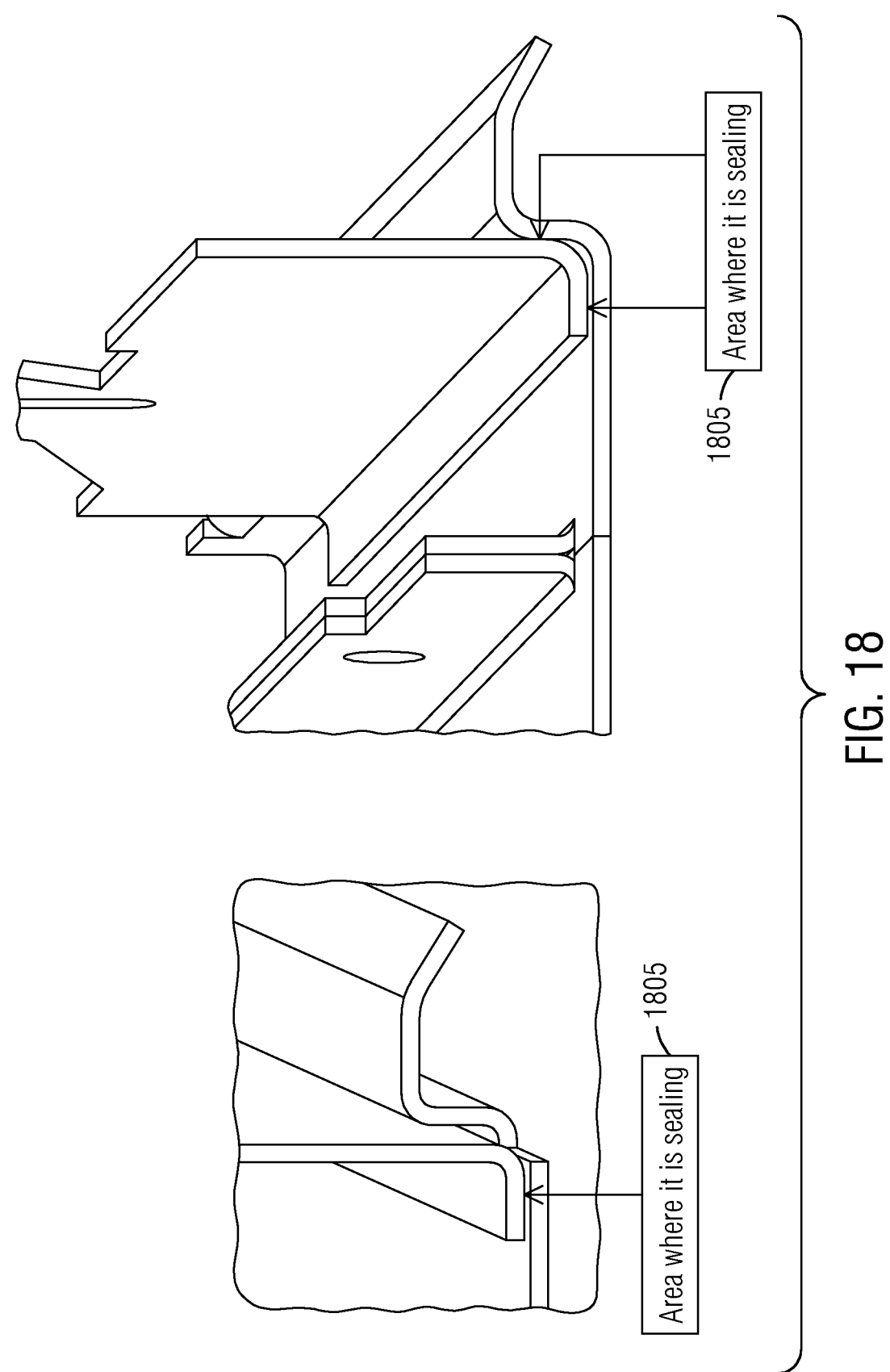
FIG. 18 illustrates a sealing area in accordance with an embodiment of the present invention.
Figures 19, 20:
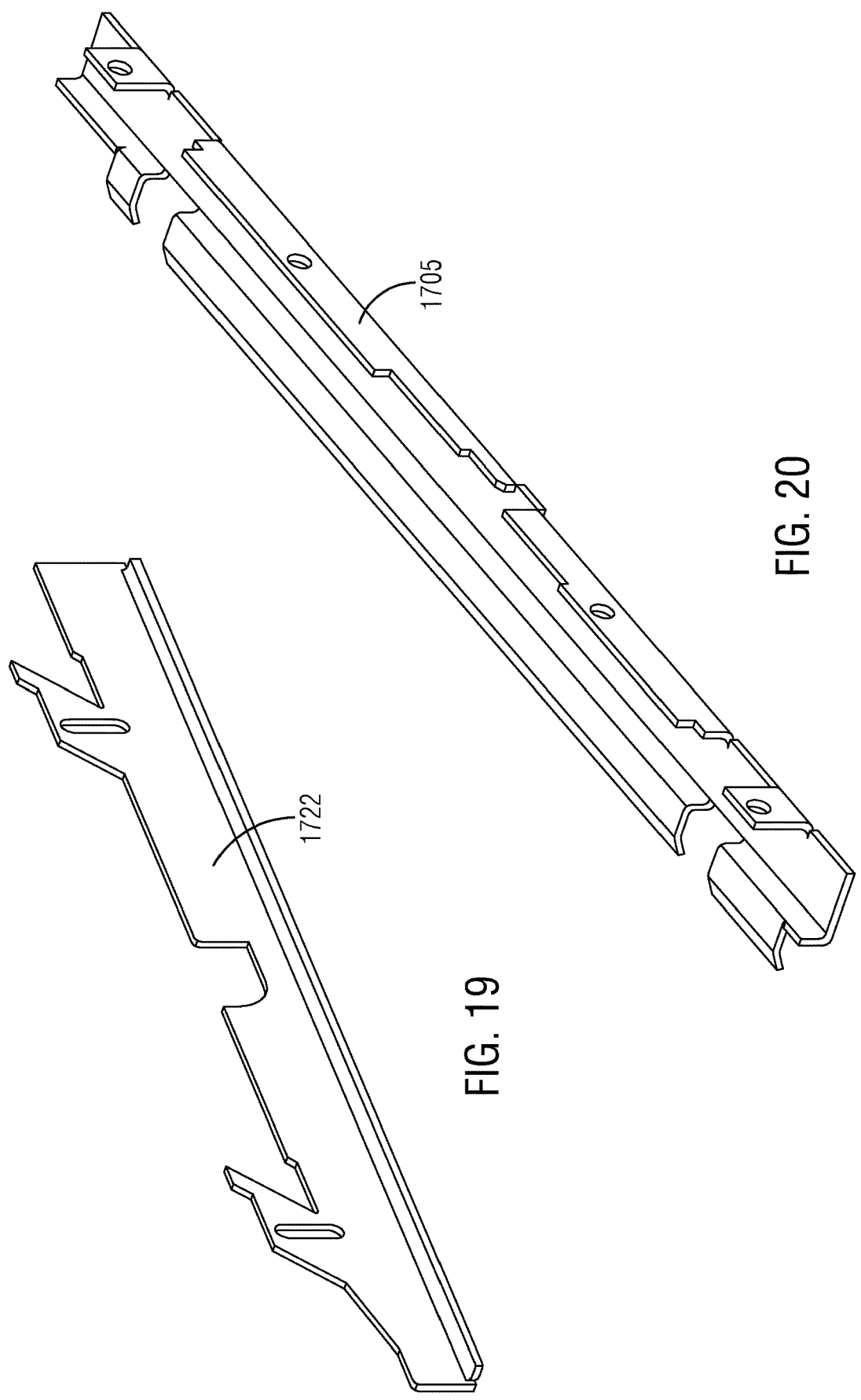
FIG. 19 illustrates a door sealing and latching ledge in accordance with an embodiment of the present invention.
FIG. 20 illustrates a door frame in accordance with an embodiment of the present invention.

FIG. 17 illustrates a door sealing and latching ledge 1722, is leading behind a door frame 1705 in accordance with an embodiment of the present invention. FIG. 18 illustrates a sealing area 1805 in accordance with an embodiment of the present invention. FIG. 19 illustrates the door sealing and latching ledge 1722 in accordance with an embodiment of the present invention. FIG. 20 illustrates the door frame 1705 in accordance with an embodiment of the present invention.

Figure 21:
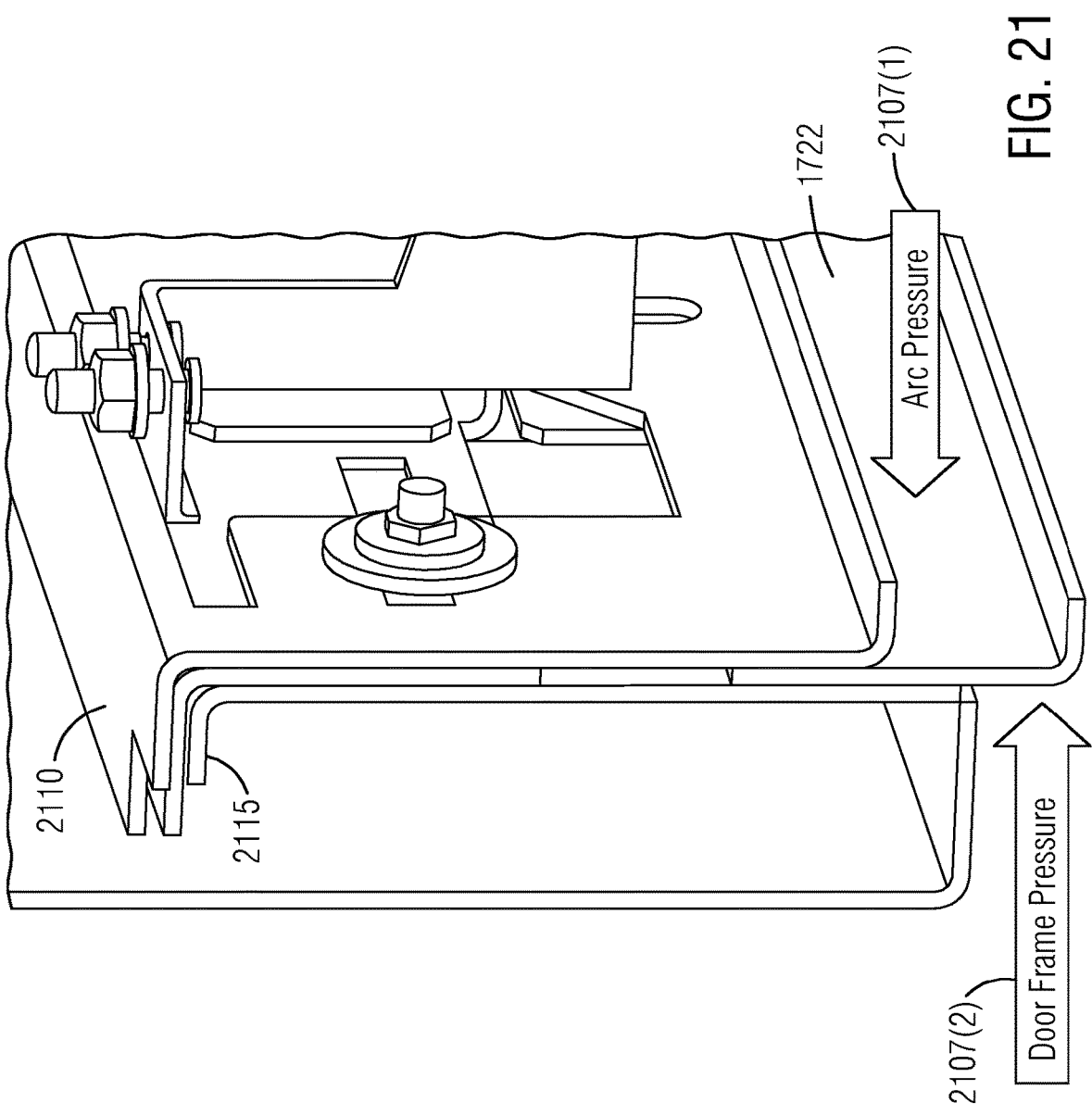
FIG. 21 illustrates door sealing and latching that works on an arc pressure in accordance with an embodiment of the present invention.

FIG. 21 illustrates door sealing and latching that works on an arc pressure in accordance with an embodiment of the present invention. An arc pressure 2107(1) hits the door and the Door Frame 1705 holds the door in place. The Door Frame 1705 is sandwiched in between a Door Closing Cover 2110 and a Door Support 2115. These two parts absorb the force and energy to bring it into the door and structure.

Figure 22:
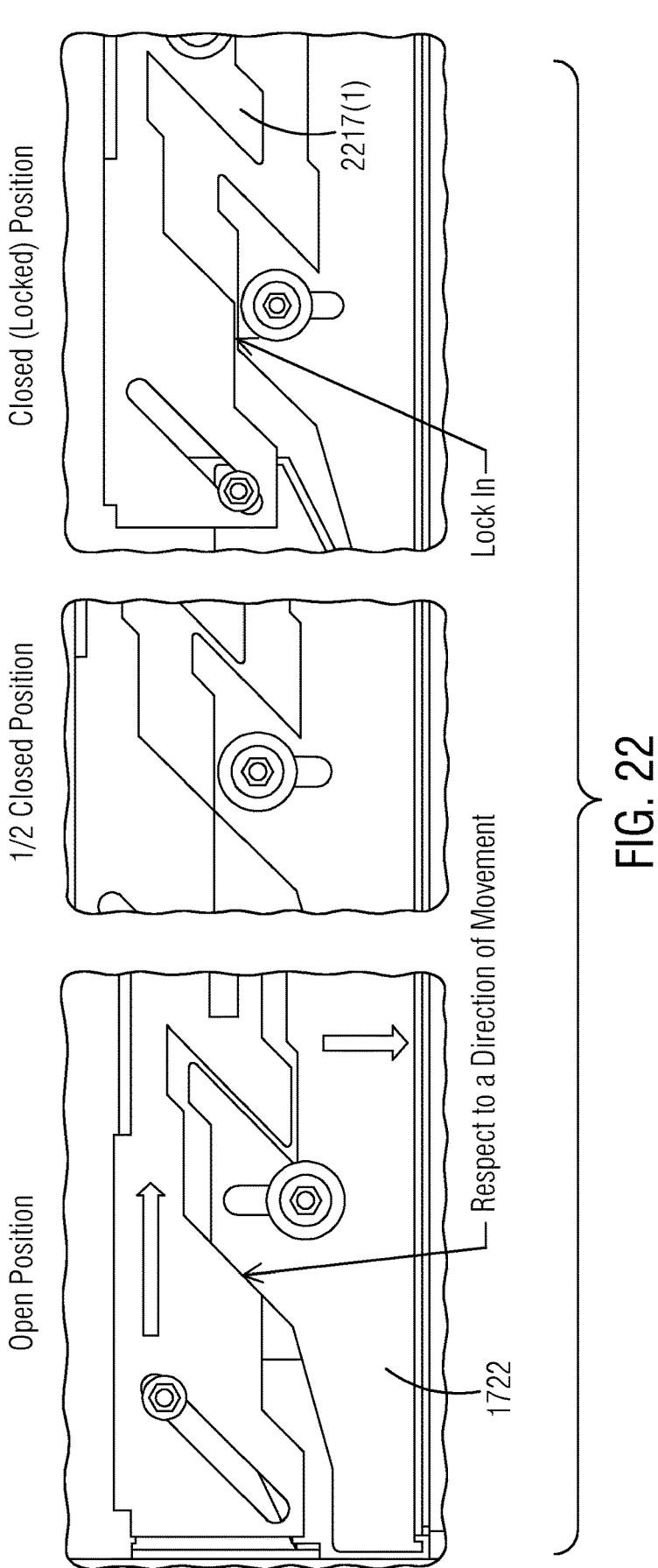
FIG. 22 illustrates how door sealing and latching drives to close a door in accordance with an embodiment of the present invention.

FIG. 22 illustrates how door sealing and latching ledge drives to close a door in accordance with an embodiment of the present invention. The door sealing and latching ledge 1722 drives to close the door. The Door Closing Ledge Lower 2217(1) moves to the right side and moves the door sealing and latching ledge 1722 down. At the ½ closed position the door sealing and latching ledge 1722 is in the closed position. The Door Closing Ledge Lower 2217(1) moves to the end closed position to lock in the door sealing and latching ledge 1722. The door sealing and latching ledge 1722 can't move back up when the arc hits the door, and it is in the locked in position.

Figure 23:
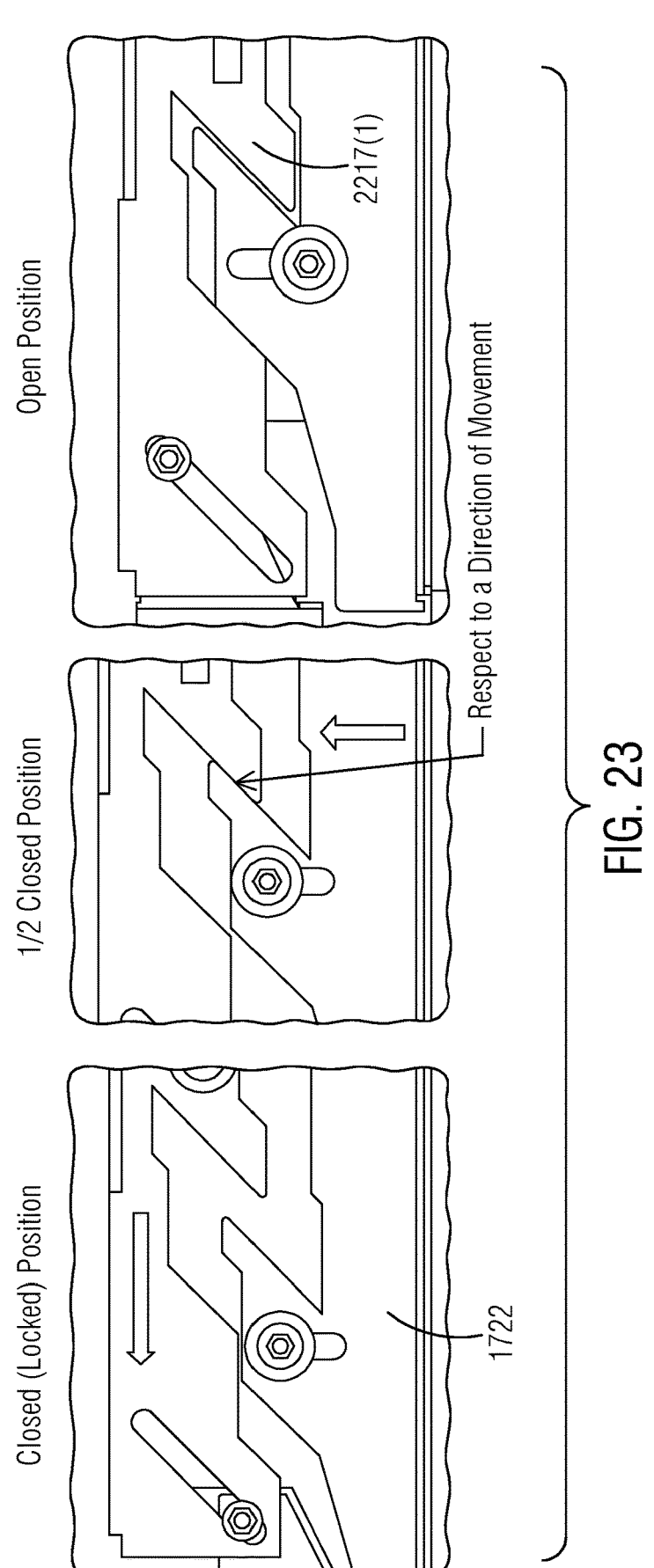
FIG. 23 illustrates how door sealing and latching drives to open a door in accordance with an embodiment of the present invention.

FIG. 23 illustrates how door sealing and latching ledge drives to open a door in accordance with an embodiment of the present invention. The door sealing and latching ledge 1722 drives to open the door. The Door Closing Ledge Lower 2217(1) moves to the left side. At the ½ closed position the door sealing and latching ledge 1722 starts to move up. The Door Closing Ledge Lower 2217(1) moves to the end open position to open the door sealing and latching ledge 1722.

FIG. 24 illustrates a method 2400 in accordance with an embodiment of the present invention. Reference is made to the elements and features described in FIGS. 1-23. It should be appreciated that some steps are not required to be performed in any particular order, and that some steps are optional.

The method 2400 comprises a step 2405 of providing a switchgear enclosure including a circuit breaker for use in an arc resistant switch gear. The method 2400 further comprises a step 2410 of providing a high voltage door. The method 2400 further comprises a step 2415 of providing enclosure door latch and sealing mechanisms configured to provide a combination of latching and sealing functionality to seal and latch the switchgear enclosure with the high voltage door via a door latching and sealing system in combination with a latch part and a door frame. To remove the circuit breaker out of the switchgear enclosure a door sealing slider which is in the switchgear enclosure must be removed.

While a high voltage door is described here a range of one or more other charging doors are also contemplated by the present invention. For example, other doors may be implemented based on one or more features presented above without deviating from the spirit of the present invention.

The techniques described herein can be particularly useful for an arc resistant switch gear. While particular embodiments are described in terms of this arc resistant switch gear, the techniques described herein are not limited to such a system but can also be used with other types of systems.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An arc resistant switch gear comprising:
a switchgear enclosure configured to include a circuit breaker,
a high voltage door, and
enclosure door latch and sealing mechanisms configured to provide a combination of latching and sealing functionality to seal and latch the switchgear enclosure with the high voltage door via a door latching and sealing system in combination with a latch part and a door frame, wherein to remove the circuit breaker out of the switchgear enclosure a door sealing slider which is in the switchgear enclosure must be removed, and
wherein the door sealing slider is mounted between two plates that are mounted on the high voltage door and there are two slots in the door sealing slider for moving up and down.

2. The arc resistant switch gear of claim 1, wherein the door sealing slider is locked in when a handle is closed such that the door sealing slider can't move up when a force through an arc flash hits the high voltage door.

3. The arc resistant switch gear of claim 2, wherein the door sealing slider includes a sealing member disposed along (i). a door bottom side, (ii). a flange of the high voltage door and (iii). enclosure seals along an inside of a bottom part.

4. The arc resistant switch gear of claim 1, further comprising:
a handle on the high voltage door that is configured to be rotated and the door sealing slider moves downwards, wherein a 45 deg slot on a door closing ledge lower will change a direction of movement.

5. The arc resistant switch gear of claim 4, wherein a sloping surface will change the direction of movement, a door sealing and latching ledge will move and a surface will lock the door sealing and latching ledge in position when the high voltage door is locked.

6. The arc resistant switch gear of claim 1, wherein the door latching and sealing system comprises:
a door sealing and latching ledge that is configured to move up and down when a handle on the high voltage door rotates.

7. The arc resistant switch gear of claim 6, wherein the door sealing and latching ledge is mounted between a door closing cover lower and a door support lower.

8. The arc resistant switch gear of claim 6, wherein when an arc pressure hits the high voltage door, the door sealing and latching ledge will get pressed to a door frame.

9. The arc resistant switch gear of claim 8, wherein the door sealing and latching ledge is configured to seal the high voltage door and latch the high voltage door to keep the arc pressure in the arc resistant switch gear.

10. A method comprising:
providing a switchgear enclosure configured to include a circuit breaker for use in an arc resistant switch gear,
providing a high voltage door, and
providing enclosure door latch and sealing mechanisms configured to provide a combination of latching and sealing functionality to seal and latch the switchgear enclosure with the high voltage door via a door latching and sealing system in combination with a latch part and a door frame, wherein to remove the circuit breaker out of the switchgear enclosure a door sealing slider which is in the switchgear enclosure must be removed, and wherein the door sealing slider is mounted between two plates that are mounted on the high voltage door and there are two slots in the door sealing slider for moving up and down.

11. The method of claim 10, wherein the door sealing slider is locked in when a handle is closed such that the door sealing slider can't move up when a force through an arc flash hits the high voltage door.

12. The method of claim 11, wherein the door sealing slider includes a sealing member disposed along (i). a door bottom side, (ii). a flange of the high voltage door and (iii). enclosure seals along an inside of a bottom part.

13. The method of claim 10, further comprising:

providing a handle on the high voltage door that is configured to be rotated and the door sealing slider moves downwards, wherein a 45 deg slot on a door closing ledge lower will change a direction of movement.

14. The method of claim 13, wherein a sloping surface will change the direction of movement, a door sealing and latching ledge will move and a surface will lock the door sealing and latching ledge in position when the high voltage door is locked.

15. The method of claim 10, further comprising:

providing a door sealing and latching ledge that is configured to move up and down when a handle on the high voltage door rotates.

16. The method of claim 15, wherein the door sealing and latching ledge is mounted between a door closing cover lower and a door support lower.

17. The method of claim 15, wherein when an arc pressure hits the high voltage door, the door sealing and latching ledge will get pressed to a door frame.

18. The method of claim 17, wherein the door sealing and latching ledge is configured to seal the high voltage door and latch the high voltage door to keep the arc pressure in the arc resistant switch gear.

* * * * *